(12) United States Patent
Lavender (10) Patent No.: US 8,876,540 B2
(45) Date of Patent: Nov. 4, 2014

(54) BATTERY COUPLING ARRANGEMENT

(75) Inventor: John Paul Lavender, Caterham (GB)

(73) Assignee: PAG Ltd., London (GB)

( * ) Notice: Subject to any disclaimer, the term of this patent is extended or adjusted under 35 U.S.C. 154(b) by 215 days.

(21) Appl. No.: 13/525,847

(22) Filed: Jun. 18, 2012

(65) Prior Publication Data
US 2013/0059477 A1 Mar. 7, 2013

(30) Foreign Application Priority Data

Sep. 2, 2011 (GB) .................................. 1115203.0

(51) Int. Cl.
| | | |
|---|---|---|
| H01R 13/44 | (2006.01) | |
| H01R 13/447 | (2006.01) | |
| H01M 2/10 | (2006.01) | |
| H01M 2/30 | (2006.01) | |
| H01R 9/24 | (2006.01) | |

(52) U.S. Cl.
CPC ........... *H01R 13/447* (2013.01); *H01M 2/1066* (2013.01); *H01R 9/2408* (2013.01); *H01M 2/30* (2013.01); *Y02E 60/12* (2013.01)
USPC .......................................... 439/140; 439/376

(58) Field of Classification Search
CPC ..... H01R 13/631; H01R 13/4538; H01R 2/20
USPC ........................ 439/500, 140, 374, 376, 928
See application file for complete search history.

(56) References Cited

U.S. PATENT DOCUMENTS

| | | | | |
|---|---|---|---|---|
| 4,050,003 A | * | 9/1977 | Owings et al. | 320/113 |
| 4,340,267 A | * | 7/1982 | Nukaga | 439/141 |
| 4,431,245 A | * | 2/1984 | Jigamian et al. | 439/344 |
| 4,554,221 A | | 11/1985 | Schmid | |
| 4,616,169 A | * | 10/1986 | Proffitt | 320/111 |
| 4,709,974 A | * | 12/1987 | Hawkins | 439/345 |
| 4,810,199 A | * | 3/1989 | Kar | 439/141 |
| 4,836,799 A | | 6/1989 | Tomer | |
| 5,089,834 A | * | 2/1992 | Nakasa et al. | 396/176 |
| 5,104,752 A | * | 4/1992 | Baughman et al. | 429/1 |
| 5,135,406 A | * | 8/1992 | Ishikawa | 439/131 |

(Continued)

FOREIGN PATENT DOCUMENTS

| | | |
|---|---|---|
| EP | 0559573 A1 | 8/1993 |
| JP | 08148233 A | 6/1996 |

OTHER PUBLICATIONS

Search Report in co-pending, related GB application No. 11152036.0, issued Oct. 25, 2011.

*Primary Examiner* — Neil Abrams
(74) *Attorney, Agent, or Firm* — Thomas|Horstemeyer, LLP (57) ABSTRACT

A battery has on opposite sides male and female terminal blocks. The female block includes positive and negative power terminals, a communications line and a link detect line. The female terminals include annular female connectors for receiving a male electrical terminal. The male terminal block has a recess for accommodating the female terminal dock. Within the recess there extend a plurality of male terminal pins, which include a positive voltage terminal, a communications line terminal, a battery status terminal and a negative or nominal ground terminal. The pins are positioned and sized so as to fit into respective female terminals. As each battery is provided with both female and male terminal blocks, any number of batteries can be stacked together. The male block includes a protective cover and latch for protecting the pins and locking the battery to a device or other battery.

17 Claims, 6 Drawing Sheets

(56) References Cited

U.S. PATENT DOCUMENTS

| | | | |
|---|---|---|---|
| 5,251,329 A * | 10/1993 | Takagi et al. | 455/572 |
| 5,306,172 A * | 4/1994 | Inada et al. | 439/299 |
| 5,369,565 A * | 11/1994 | Chen et al. | 363/146 |
| 5,412,547 A * | 5/1995 | Hornblad et al. | 362/183 |
| 5,496,657 A * | 3/1996 | Dixon, Jr. | 429/62 |
| 5,663,012 A * | 9/1997 | Shannon et al. | 429/121 |
| 5,917,152 A * | 6/1999 | Kameyama | 174/72 A |
| 5,921,797 A * | 7/1999 | Bass et al. | 439/342 |
| 6,102,725 A * | 8/2000 | Panagiotou | 439/342 |
| 6,109,938 A * | 8/2000 | Meslet et al. | 439/139 |
| 6,233,141 B1 * | 5/2001 | Lee et al. | 361/679.57 |
| 6,247,962 B1 | 6/2001 | DeSorbo | |
| 6,346,793 B1 * | 2/2002 | Shibata et al. | 320/113 |
| 6,457,988 B1 * | 10/2002 | Andersen | 439/373 |
| 6,749,960 B2 * | 6/2004 | Takeshita et al. | 429/123 |
| 6,783,403 B2 * | 8/2004 | Lafragette et al. | 439/717 |
| 6,935,883 B2 * | 8/2005 | Oddsen, Jr. | 439/374 |
| 7,064,519 B2 * | 6/2006 | Ito | 320/112 |
| 7,271,760 B2 * | 9/2007 | Bartosik et al. | 342/20 |
| 7,347,714 B2 * | 3/2008 | Liang | 439/374 |
| 7,390,211 B2 * | 6/2008 | Moscovitch | 439/374 |
| 8,029,311 B2 * | 10/2011 | Ohshima et al. | 439/374 |
| 8,299,656 B2 * | 10/2012 | Allard et al. | 307/154 |
| 8,573,324 B2 * | 11/2013 | Turner et al. | 173/217 |
| 2005/0226741 A1 * | 10/2005 | Huang | 417/411 |
| 2007/0037456 A1 | 2/2007 | Burgess | |
| 2008/0254670 A1 | 10/2008 | Balsells et al. | |

* cited by examiner

BATTERY COUPLING ARRANGEMENT

CROSS REFERENCE TO RELATED APPLICATIONS

The present application claims priority to GB Application No. 1115203.0, filed Sep. 2, 2011.

FIELD OF THE INVENTION

The present invention relates to a battery coupling arrangement for coupling an electrical battery to a device, particularly to a mechanical and electrical coupling arrangement. The present invention is also directed to a battery provided with a coupling arrangement as taught herein.

BACKGROUND OF THE INVENTION

There is an established industry in providing batteries for powering electrical devices used for a multitude of applications, particularly batteries which are intended to be replaced during the use of the device. One such application is in the field of professional video cameras, where the video crew would typically travel with a plurality of batteries for powering the cameras for significant periods of time, particularly where mains power supplies might not be available. There are many other similar applications, including also for powering electric vehicles and other large devices.

In many such applications, the batteries may be handled roughly and it is therefore important that they are constructed to withstand such treatment.

There is also a growing need to provide higher capacity batteries in order to power devices which are more power hungry. Examples include High and Very High Definition cameras, vehicles and so on. However, high capacity batteries can be dangerous as a result of the potential current which they can produce. particularly as a result of device malfunction or damage to the battery. As a result of this, airlines for instance limit the capacity of batteries which can be carried on board to no more than 100 Watt-hours (Wh). While this may be a reasonable maximum capacity for travel safety purposes, batteries of such capacity are insufficient for powering some modern electronic devices, such as high powered cameras. As a result, it is known to couple together two sub-100 Wh batteries together.

It is common in many applications to use batteries which are not unique to a particular device or make of device. As a result, such batteries typically need to be designed to fit the device which they are to power. This can mean providing the same battery in a plurality of different fittings. Although many professional video cameras use a V-mount coupling, common on cameras provided by Sony Corporation, the locking mechanism is not necessarily the same for different cameras. While it is feasible to provide batteries with different fittings, if it is also desired to be able to couple a plurality of batteries to one another, as taught herein, the coupling arrangement can become complex.

SUMMARY OF THE PRESENT INVENTION

The present invention seeks to provide an improved battery coupling arrangement and an improved battery.

According to an aspect of the present invention, there is provided a battery coupling arrangement for coupling an electrical battery to a device, including a female connector unit provided with a plurality of female electrical terminals, and a male connector unit including a plurality of male electrical terminals, wherein the male terminals are in the form of pins and the female terminals include bores or channels into which the pins can pass and be held.

The applicant is not aware of a battery of such a type which is provided with pin terminals. Prior art batteries, to the applicant's knowledge, have flat electrical terminals, considered to be stronger and more suited to rough handling. However, flat connectors do not guarantee a good electrical contact, thus limiting the capacity of the battery. This is particularly the case for batteries which may be coupled together in parallel to increase the current deliverable by the batteries. Electrical terminals in the form of pins, however, can provide a much better electrical coupling than flat connectors, thus being suited for high current applications. They allow the coupling together of several and many batteries, which to the applicant's knowledge has not been done before.

Advantageously, the battery coupling arrangement includes a protective barrier located to protect the pins of the male electrical terminals. The protective barrier, thus can protect the pins during rough handling of the battery.

Preferably, the protective barrier and the male electrical terminals are movable relative to one another from a protective position in which the barrier at least partially overlies the pins and an active position in which the pins are exposed. By this arrangement, the protective cover can substantially overlie the pins, thereby protecting these, until they need to be connected to their counterpart female terminals.

In a preferred embodiment, there is provided a support element configured to support free ends of the pins when exposed. Advantageously, the support element includes recesses or openings for receiving the free ends of the pins. The support element acts to support the free ends of the pins, and in practice the weakest part of the pins. It is preferred that the support element supports the pins while they are connected to the female terminals, thus providing a strong and secure coupling arrangement.

Advantageously, the support element is connected to the protective barrier, for instance being integral with the protective barrier. Thus, the support element will move with the protective barrier.

It is preferred that the protective barrier and/or the support element are provided with a guide element for guiding a female connector unit towards the pins. The guide element may be, for instance, a chamfered or tapered surface.

In an embodiment, the battery coupling arrangement includes a latch for locking the protective barrier in a pin exposing configuration, and a latch actuator operable to unlatch the latch and thereby unlock the protective barrier for the pin exposing configuration. The latch is operable to latch a battery provided with the male connector unit to another or device provided with the female connector unit. Thus, the latch can fix a battery mechanically by itself, thus without having to reply upon a latching or locking mechanism specific to one type or make of device.

According to another aspect of the present invention, there is provided a battery including at least a male or a female connector unit of a coupling arrangement as specified herein. Advantageously, the battery includes both male and female connector units, located on different sides of the battery, for instance on opposite sides of the battery. With each battery provided with male and female connector units, it is possible to couple a plurality of batteries together.

BRIEF DESCRIPTION OF THE DRAWINGS

Embodiments of the present invention are described below, by way of example only, with reference to the accompanying drawings, in which.

DESCRIPTION OF THE PREFERRED EMBODIMENTS

Figure 1:
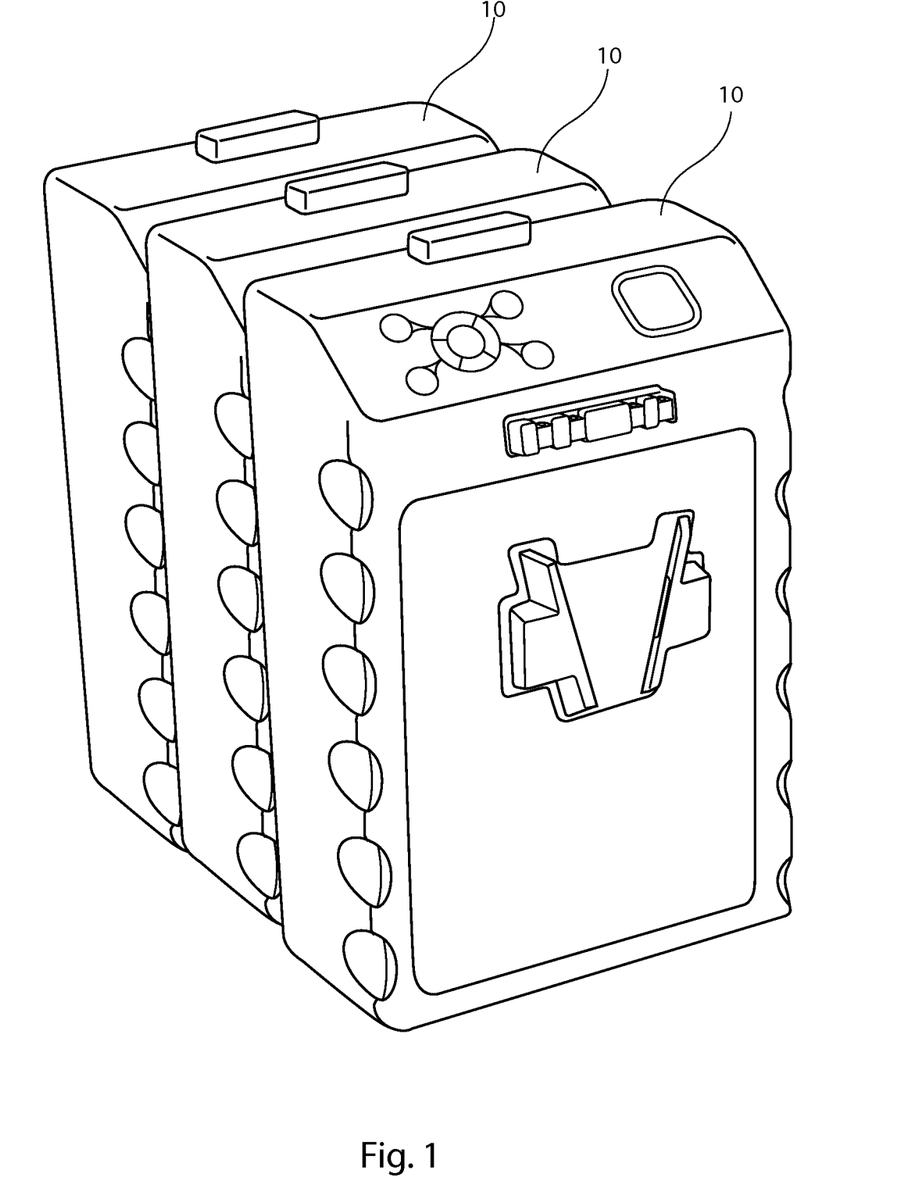
FIG. 1 is a schematic diagram of three batteries of the type taught herein, coupled to one another in a stack to provide an overall increased battery capacity (Wh)

Referring first to FIG. 1, the teachings disclosed herein are directed to coupling a plurality of batteries together in a stack in order to increase the capacity of a battery-based power supply to an electrical device. The stack can provide greater current to the device and/or can power the device for a greater length of time than can a single battery. This improvement can be achieved even with batteries having a relatively low capacity or current rating.

With reference to FIG. 1, there are shown three batteries 10, which in this example are identical in their characteristics, coupled together mechanically and electrically in parallel. The couplings, therefore, are such that the potential difference across the battery terminals remains the same but the total current rating of the batteries is, in this example, multiplied threefold. Other embodiments may provide for electrical coupling of batteries in series in order to increase potential difference.

The mechanical couplings of the batteries, of which further details are described below with reference to FIGS. 5 to 11, are such that each battery has a female terminal block as well as a male terminal block. The batteries 10, therefore, are substantially identical in their structures, so as to be connectable in any order and such that a virtually unlimited number of batteries 10 can be coupled together. In other embodiments, however, the battery 10 may be provided with just one of the male and female terminal blocks, preferably the male terminal block. The other terminal block would be provided on the device or one a coupling element to the device. It is preferred, however, that the batteries 10 are each provided with both female and male terminal blocks.

Figure 2:
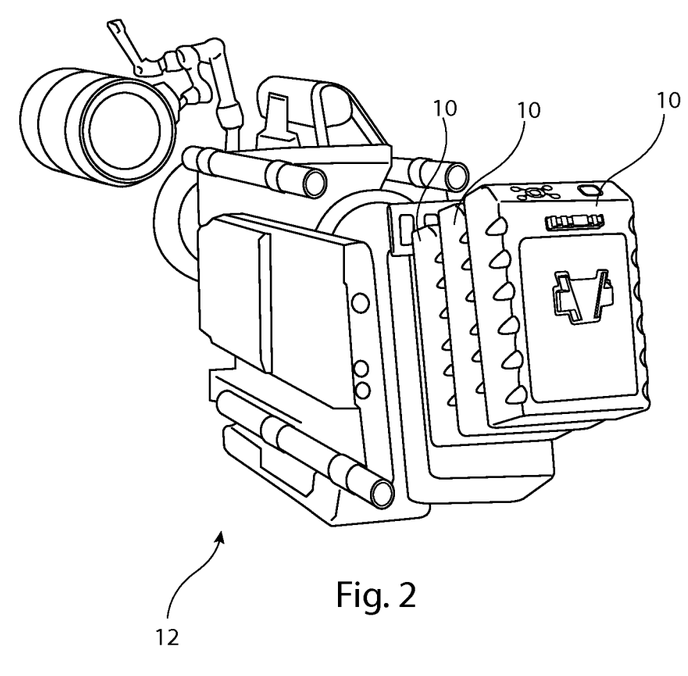
FIG. 2 shows in schematic form an example application for a battery stack of the type shown in FIG. 1, in this embodiment being coupled to a professional camera.

Referring now to FIG. 2, the batteries 10, hereinafter referred to as a stack, are shown coupled to a professional camera 12. The number of batteries 10 in the stack can be chosen according to the needs and use of camera 12, from a single battery in some instances to a large number. It will be appreciated, of course, that there is likely to be a practical limit to the number of batteries which can be stacked together, dependent for example on weight, usage of the device and so on. There is, however, no theoretical limit to the number of batteries which can be stacked together.

Figure 3:
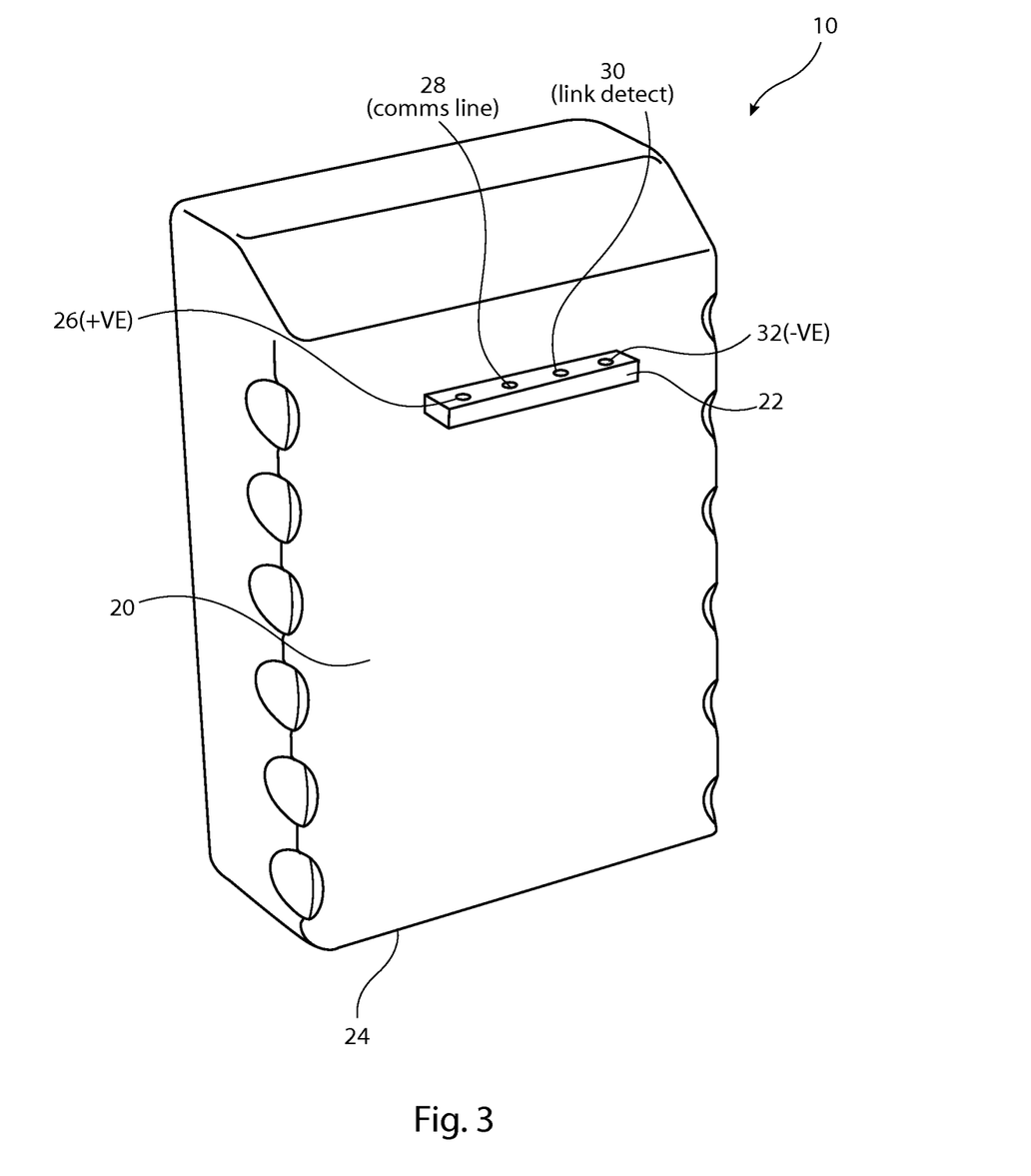
FIG. 3 is a schematic diagram of the front face of a battery of the type taught herein, showing a female terminal block of the battery.
Figure 4:
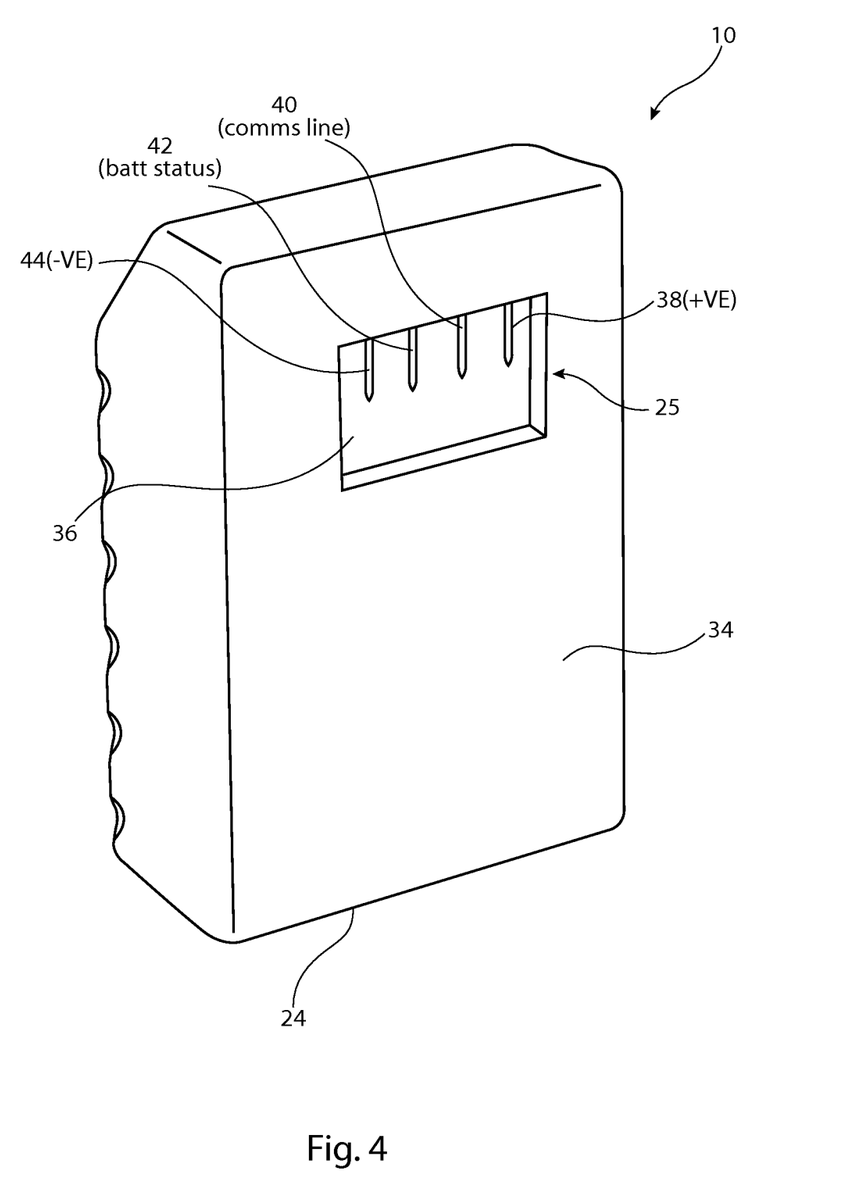
FIG. 4 is a view of the rear of the battery of FIG. 3.

Referring now to FIGS. 3 and 4, these show, respectively, front and rear views of an embodiment of battery 10 according to the teachings herein. Specific details of the structure of the preferred embodiment of battery 10 are disclosed below.

With reference to FIG. 3, the front face 20 of battery 10 has extending out therefrom a female terminal block 22, which lies substantially horizontally with respect to the base 24 of the battery. The female terminal block 22 includes, in this example, four female terminals which provide, respectively, a positive power terminal 26, a communications line 28, a link detect line 30 and a negative power terminal 32. It will be appreciated that the negative terminal 32 will generally be at nominal ground. For powering an electronic device such as a camera, the battery 10 may typically produce from 14 to 17 volts across its positive and negative terminals 26, 32.

The female terminals 26, 32 are, in this embodiment, channels or bores through the terminal block 22 which are lined with a tubular or annular female connector for receiving an associated male electrical terminal. The female connectors are coupled to the circuitry in the battery as well as to the battery cells.

Referring now to FIG. 4, there is shown in schematic form the rear side 34 of battery 10 of FIG. 3 provided with the preferred embodiment of male terminal block 25. This side 34 has a recess 36 of a depth preferably sufficient to accommodate the projection of the female terminal dock 22. Within the recess 36 there extend, towards the base 24, a plurality of male terminal pins 38-44, which in this example are four in number, as per the female terminals 26-32. The male terminal pins include a positive voltage terminal 38, a communications line terminal 40, a battery status terminal 42 and a negative or nominal ground terminal 44. The pins of the terminals 38-44 are positioned and sized so as to fit into respective female terminals 26-32 and in particular such that: the positive female terminal 26 couples to the positive male terminal 38 of two batteries 10 coupled together; the female communications line terminal 28 couples to the male communications line terminal 40; the female link detect terminal 30 couples to the male battery status terminal 42; and the female negative terminal 32 couples to the negative male terminal 44.

The skilled person will appreciate that the arrangement of female and male terminals can be transposed, such that the male terminals are located at the front face 20 of the battery 10 and the female terminals on the rear face 34. Whether or not the terminals are male or female is immaterial to the teachings herein, as long as a plurality of batteries 10 can be coupled together in a sequence of the type shown in FIG. 1.

As each battery 10 is, in the preferred embodiment, provided with both a female terminal block 22 and a male terminal arrangement 36-44, any number of batteries 10 can be coupled together in a stack. As explained above, the coupling is preferably such that the capacity (ampere-hours) increases with the number of batteries stacked together, thereby to provide greater current and/or greater operating time of the stack to a given electrical device. The male and female terminal blocks 22, 25 are shown located on opposite sides of the battery 10. However, in other embodiments, they may be located on other faces of the battery, one example being the rear and one side of the battery. The location of the male and female blocks 22, 25 is not relevant for the purposes of the disclosure herein.

Figure 5:
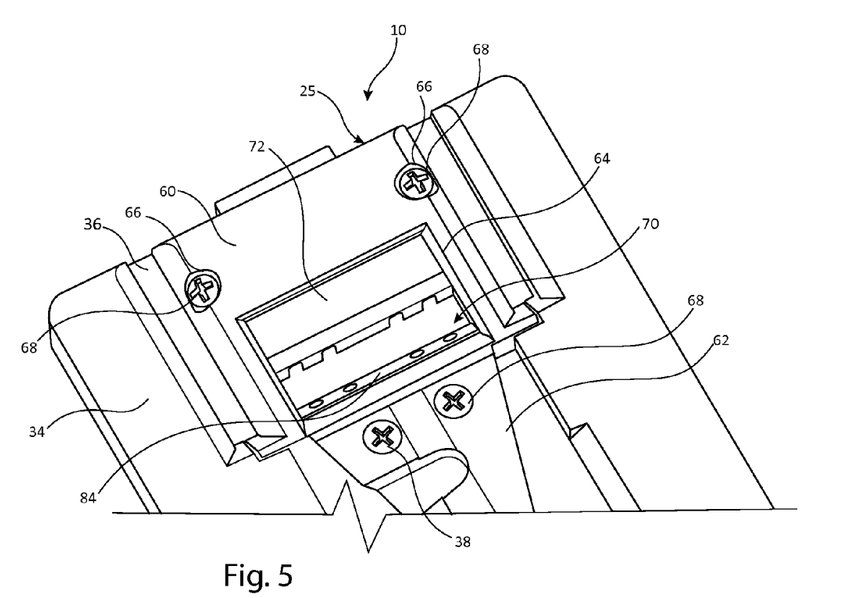
FIG. 5 is a schematic view of the preferred embodiment of male terminal block of the battery of FIGS. 1 to 4 in an unlatched condition.
Figure 6:
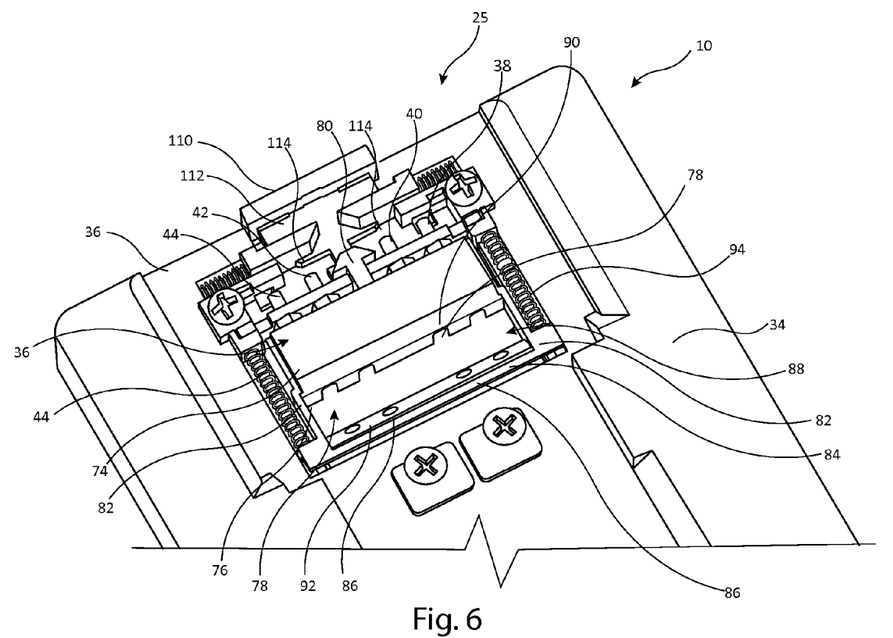
FIG. 6 is a schematic view of the terminal block of FIG. 5 with the protective cover removed.
Figure 7:
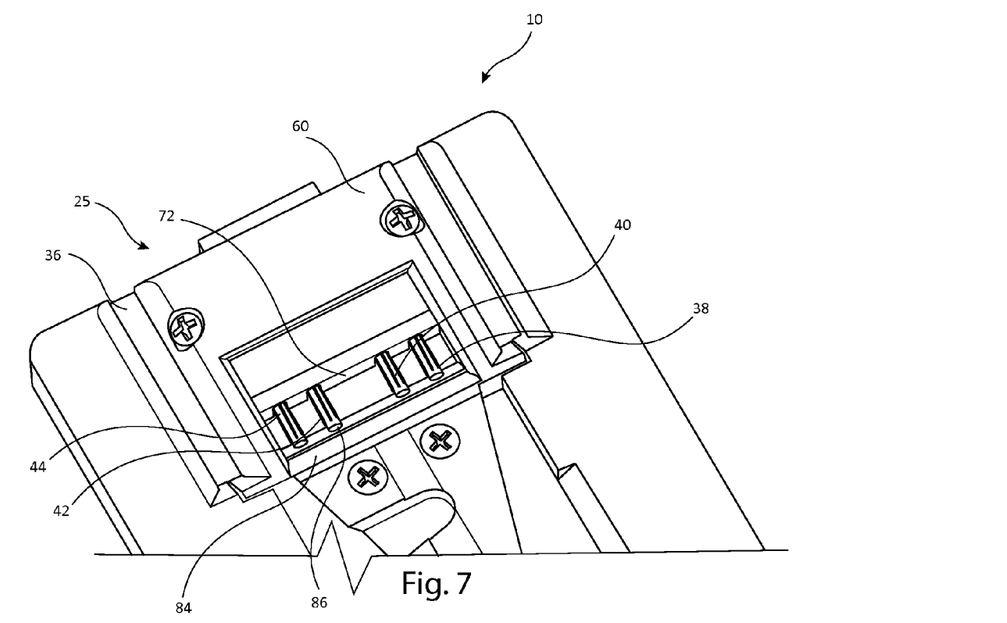
FIG. 7 is a schematic view of the preferred embodiment of male terminal block of the battery of FIGS. 1 to 6 in a latched condition.
Figure 8:
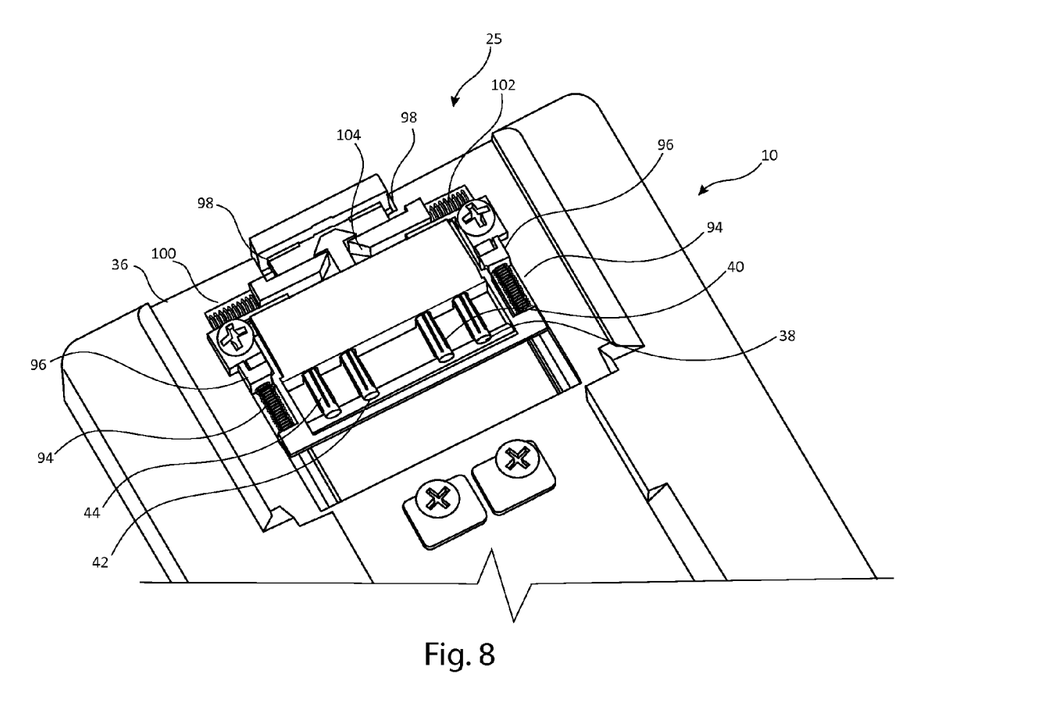
FIG. 8 is a schematic view of the terminal block of FIG. 7 with the protective cover removed.

Referring to FIGS. 5 to 8, there are shown various views of the preferred embodiment of male terminal block 25. FIGS. 5 and 6 show the male terminal block 25 in a configuration in which a protected cover plate covers the pin terminals, whereas FIGS. 7 and 8 show use of the male terminal block 25 with the protected cover plate moved to a position in which the pins 38-44 are exposed for coupling to a female terminal block 22.

Referring first to FIG. 5, the male terminal block 25 includes a cover plate 60 which, in this example, is integral a V-mount 62 of known form, therefore not described in further detail herein. The cover plate 60 also includes a central rectangular opening or cut-out 64. A plurality of screw holes 66 is also provided for receiving screws 68 for fixing the cover plate 60 to the battery 10 housing. The cover plate 60 holds the various elements of the mail connector block 25 together.

The cover plate 60, as can be seen in the Figures, fits within recess 36 of the male connector block, preferably in such a manner that the top surface of the cover plate 60 is substantially flush with the rear wall 34 of the battery 10. The rear of the battery 10 thus has no projections beyond the rear wall 34 which might otherwise cause coupling difficulties to other devices.

The cover plate 60 is spaced from the surface of the recess 36, so as to provide a chamber or housing 70 within which the components of the males terminal are located, as can be seen in particular in FIGS. 6 and 8, in which the cover plate 60 has been removed for the purposes of illustration.

Located in the chamber 70 formed by the cover plate 60 is a protective barrier 72 which, as explained below, is able to slide within the chamber 70.

With reference in particular to FIGS. 5 and 6, the protective barrier 72 includes a barrier plate 74 which has a depending flange 76 provided with a plurality of cut-outs 78 within which the pins 38-44 of the male electrical terminals can pass, as will be apparent in the description below with reference to FIGS. 7 and 8. Extending coplanar beyond the barrier plate 74 is an arrow-shaped latch element 80, the purpose of which is explained below.

The protective barrier 72 also includes first and second tabs or legs 82 which extend from the barrier plate 74 in a direction opposite that of the latching element 80. At the ends of the legs 82 is a support element 84, which extends between the two legs 82. In the preferred embodiment, the barrier plate 74, depending flange 76, latching element 80, legs 82 and support element 84 are integral with one another and in a practical embodiment made from the same moulding as a plastics component.

The support element 84 includes four bores or recesses 86, which are aligned with the cut-outs 78 in the flange 76 of the barrier plate 74. These bores or recesses 86 have a diameter roughly about the same as the diameter of the tips of the pins 38-44, thus to receive these pins for the purposes described below.

The support element 84 and depending flange 76 of the barrier plate 74, in this embodiment, provide a rectangular shaped recess 88, which is of a width and height able to accommodate a female terminal block 22 of a corresponding battery. In order to facilitate the positioning of a female terminal block 22 into the rectangular recess 88, the barrier plate 74 is provided with an angled or chamfered surface 90 and the support element 84, specifically its surface 92, is also angled or chamfered. The two surfaces 90, 92 taper towards rectangular recess 88 and in use can facilitate the insertion of a female terminal block 22 into the recess 88.

The other components of the male terminal block 25, which can be seen in FIG. 6, will be described in more detail below in connection with FIG. 8.

Referring now to FIG. 7, this is a view similar to FIG. 5, although showing the protective barrier 72 in an engaged position, in which it has moved upwardly to be hidden underneath the cover plate 60. The support element 84 has risen equally, by virtue of being integral with the barrier plate 74, such that the holes of recesses 86 engage with respective pins 38-44 of the male electrical terminal. This position of the protective barrier 72 could be described as an engaged or pin exposing position. In contrast, FIGS. 5 and 6 show the protected barrier 72 in a protective position.

Referring now to FIG. 8, this is the same view of the male terminal block 25 as in FIG. 7, but in which the protective barrier 60 has been removed so as to show the internal components of the male terminal block 25. FIG. 8 is thus analogous to FIG. 6 but with the protected barrier 72 in the exposed position.

Referring to FIG. 8, the male terminal block 25 includes first and second coil springs 94 which are each located in a respective recess between the legs 82 of the protective barrier 72 and an internal surface of the cover plate 60. The coil springs 94 are bound at one end by laterally extending flanges provided at the ends of the legs 82 and of the support element 84 and, at the other end, a shoulder 96 formed within the structure of the male terminal unit 25. The coil springs 94 in practice are longitudinally compressed to provide a bias in force which pushes the protective barrier 72 to the protective position over the pins 38-44 and to separate the support element 84 from the pins 38-44.

First and second latch pins 98 are positioned within respective guide channels 100 formed in the casing of the male terminal unit 25. The latch pins 98 are slideable within the guide channels 100, which may include a stop shoulder for preventing the latch pins 98 from extending out of the guide channels 100 beyond a given amount. Within the guide channels 100 there are provided second coils springs 102 which bias the latch pins 98 to their outmost, extended, position as shown in both FIGS. 6 and 8.

As can be seen in FIG. 8, the latching element 80 of the protective barrier 72 is positioned so to be held by the latching pins 98 when the barrier plate 74 is in its upper or exposed position as shown in FIGS. 7 and 8. For latching purposes, the latching element 80 is provided with tapered side walls which cooperate with tapered side walls 104 of the latching pins 98. The arrangement, it will be appreciated, is such that when the barrier plate 74 is moved upwards to the pin-exposed position, the tapered side walls of the arrow shaped latching element 80 will push against the tapered side walls 104 of the latching pins 98, urging the pins 98 apart until the head of the latching element 80 passes beyond the upper surface of the pins 98, whereupon the springs 102 push the latch pins 98 towards one another again, causing these to latch or lock the protective barrier 72 in the upper, exposed position as shown in FIG. 8. In this position, therefore, the protective barrier 72 is fixed in the pin-exposed position and the support element 84 is similarly locked to the free ends of the pins of the 38-44.

Referring now in particular back to FIG. 6, the male terminal unit 25 is also provided with a release button 110. This button 110 extends beyond the top of the cover plate 60 and includes a depending flange or wall 112, the latter including, in particular, angled walls 114, which angle out of or away from one another towards the release button 112. These angled walls 114 abut corresponding internal walls (not visible in the drawings) in cut-outs at the rear of the latching pins 98.

The arrangement is such that pressing the release button 110 pushes the depending wall 112 downwardly, that is towards the protective barrier 72, thereby urging the latching pins 98 apart, until the arrow shaped latch element 80 is released from the pins 98. At this point the protective barrier 72 is able to move downwardly, that is to its protective position as shown in FIGS. 5 and 6. Releasing the button 110 causes this to move to its extended position as shown in FIGS.

5 to 8, as a result of the biasing force acting against the angled walls 114 of the coil springs 102. Thus, release button 110 is reset to its rest position.

In practice, the male terminal unit 25 is normally in the configuration shown in FIGS. 5 and 7, with the protective barrier 72 covering or at least substantially enveloping the pins 38 to 44 of the male terminals. This thus protects the pins from potential damage which might occur during handling, transportation, use and so on of the battery 10. When it is desired to connect two batteries 10 to one another, the female terminal unit 22 one of batteries 10 is inserted into the rectangular recess 88 between the protective barrier plate 74 and the support element 84 of the other battery 10. This is assisted, as described above, by the inwardly tapering walls or surfaces 84 and 90 of these two components. Once the female terminal unit 22 is inserted into the rectangular recess 88, it can then be pushed "upwardly", that is towards cover plate 60 or release button 110 on top of the battery 10. So doing pushes the barrier plate 74 upwardly, against the return force of the springs 94. Pushed sufficiently, the protective barrier 72 becomes latched in its pin-exposed position, by means of engagement of the latching element 80 to the latching pins 98. This occurs as the female terminal block 22 is moved upwardly within the opening 64, causing the pins 38-44 to pass into the female terminals 26-32. This effects electrical connection between the male and female terminal units, this connection being particularly effective as a result of the relatively large surface area of the connection, the circumferential connection and also the provision of sprung legs in the pins 38-44 as can be seen, in particular, in FIGS. 7 and 8.

The movement of the barrier plate 74 and inserted female terminal unit 22 also results in the movement of the support element 84 upwardly, until this reaches the position shown in FIGS. 7 and 8, that is where it holds and supports the free ends of the male terminal pins 38-44. In this configuration the female terminal block 22 is held within the recess 88 and around the pins 38-44 themselves. Of course, where a V-mount 62 is also provided, this will provide a further mechanical coupling of the two batteries 10 together.

Once the protective barrier 22 is latched in position, as shown in FIGS. 7 and 8, it is not possible to release two batteries. This can only be done by unlatching the protective barrier 72 from the latching pins 98, that is by depression of the release button 110. When this happens, it is possible to slide the female terminal unit 22 downwardly off the pins 38-44, thereby to release the two batteries 10 from one another.

It will be appreciated that this structure of male and female terminal units, in particular the locking of a female terminal unit 22 to a male terminal block 25, can in itself provide the locking between two batteries which are to be coupled to one another. It is not necessary to provide a separate locking arrangement, as is the case with a number of prior art devices.

It is to be appreciated that the battery 10 may be provided with other electrical terminals suited for coupling to an electrical device. The battery 10 may, for instance, be provided with a plurality of electrical terminals at its base 24 to couple to a professional camera 12 of the type shown in FIG. 2. These electrical terminals are conventional in the art and therefore are not described in detail herein.

It will also be appreciated that the number and positions of the male and female electrical terminals will not necessarily be as per the embodiments described above and that these may be different in different applications.

Moreover, although the embodiments described above and shown in the drawings have female and male units 22, on opposite sides of the battery 10, they do not need to be at these locations. The arrangement shown is particularly useful for stacking batteries linearly (to be coupled electrically parallel). However, the batteries could be connected together in other ways. For instance, the male and female terminal blocks could be on adjacent sides walls of the battery 10. Similarly, in other embodiments, there may be provided more than one female and male terminal unit 22, 25 on each battery. This would allow one battery to be connected to more than two other batteries directly.

The disclosures in British patent application number GB 1115203.0, from which this application claims priority, and in the abstract accompanying this application are incorporated herein by reference.

I claim:

1. A battery coupling arrangement for coupling an electrical battery to a device, the battery coupling arrangement comprising:
   a female connector unit provided with a plurality of female electrical terminals;
   a male connector unit including a plurality of male electrical terminals, wherein the male electrical terminals are in the form of pins, and the female electrical terminals include bores or channels into which the pins of the male electrical terminals can pass and be held;
   a protective barrier located to protect the pins of the male electrical terminals;
   a support element configured to support and hold free ends of the pins of the male electrical terminal when the pins are exposed from the protective barrier; and
   wherein at least one of the electrical battery or the device comprises at least one of the female connector unit or the male connector unit.

2. A battery coupling arrangement according to claim 1, wherein the protective barrier and the male electrical terminals are movable relative to one another from a protective position in which the barrier at least partially overlies the pins and an active position in which the pins are exposed.

3. A battery coupling arrangement according to claim 2, wherein the protective barrier is movable.

4. A battery coupling arrangement according to claim 2, wherein the protective barrier substantially envelops the pins in the protective position.

5. A battery coupling arrangement according to claim 1, wherein the support element includes recesses or openings for receiving the free ends of the pins.

6. A battery coupling arrangement according to claim 1, wherein the support element is connected to the protective barrier.

7. A battery coupling arrangement according to claim 6, wherein the support element is integral with the protective barrier.

8. A battery coupling arrangement according to claim 6, wherein the support element moves with the protective barrier.

9. A battery coupling arrangement according to claim 1, wherein the support element supports the free ends of the pins when the pins are engaged with the female electrical terminals of a female connector unit.

10. A battery coupling arrangement according to claim 1, wherein at least one of the protective barrier and the support element is provided with a guide element for guiding a female connector unit towards the pins.

11. A battery coupling arrangement according to claim 10, wherein the or each guide element is a guide surface.

12. A battery coupling arrangement according to claim 11, including guide surfaces located on the protective barrier and the support element, which guide surfaces taper towards the pins.

13. A battery coupling arrangement according to claim 1, including a latch for locking the protective barrier in a pin exposing configuration.

14. A battery coupling arrangement according to claim 13, including a latch actuator operable to unlatch the latch and thereby unlock the protective barrier for the pin exposing configuration.

15. A battery coupling arrangement according to claim 13, wherein the latch is operable to latch a battery provided with the male connector unit to another battery or device provided with the female connector unit.

16. An electrical battery including a battery coupling arrangement for coupling the electrical battery to a device, the battery coupling arrangement including:

a female connector unit on the battery and provided with a plurality of female electrical terminals;

a male connector unit on the battery and including a plurality of male electrical terminals, wherein the male electrical terminals are in the form of pins and the female electrical terminals include bores or channels into which the pins can pass and be held;

a protective barrier located to protect the pins of the male electrical terminals; and a support element configured to support and hold free ends of the pins of the male electrical terminal when the pins are exposed from the protective barrier.

17. An electrical battery according to claim 16, wherein the male and female connector units are located on opposite sides of the battery.

* * * * *